M. LEAR & J. SLOOP.
COMBINED HOOK AND SADDLE SEAT.
APPLICATION FILED SEPT. 4, 1914.

1,153,122.

Patented Sept. 7, 1915.

Witnesses
Frederick P. Moran
D. W. Gould

Inventors
Milton Lear,
John Sloop,
By Victor J. Evans
Attorney

UNITED STATES PATENT OFFICE.

MILTON LEAR AND JOHN SLOOP, OF FINDLAY, OHIO.

COMBINED HOOK AND SADDLE-SEAT.

1,153,122.     Specification of Letters Patent.     Patented Sept. 7, 1915.

Application filed September 4, 1914. Serial No. 860,233.

*To all whom it may concern:*

Be it known that we, MILTON LEAR and JOHN SLOOP, citizens of the United States, residing at Findlay, in the county of Hancock and State of Ohio, have invented new and useful Improvements in Combined Hooks and Saddle-Seats, of which the following is a specification.

The invention relates to a combined hook and saddle seat for gig saddles, wherein means are provided for holding the saddle seat and crupper loop in position and for removably securing the hook to the seat.

The invention in the preferred form of details will be described in the following specification, reference being had particularly to the accompanying drawings, in which:—

Figure 1:
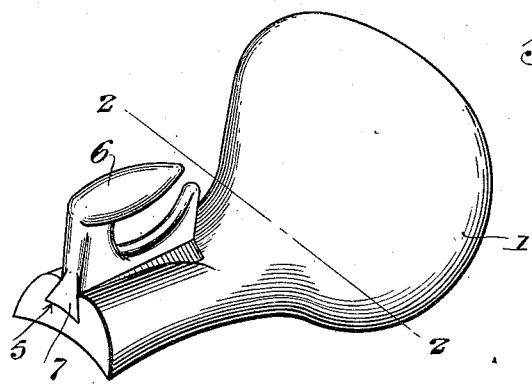
Figure 2:
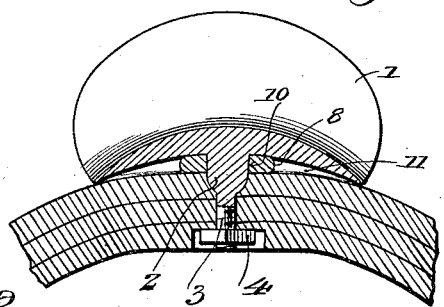
Figure 3:
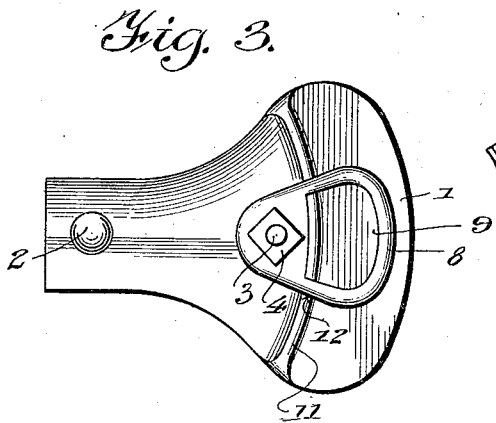
Figure 4:
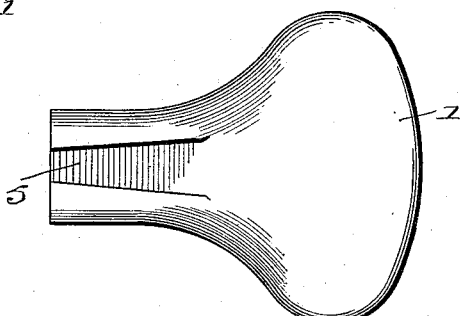

Figure 1 is a perspective view of the improved device. Fig. 2 is a transverse sectional view on the line 2—2 of Fig. 1. Fig. 3 is a bottom plan view of the saddle. Fig. 4 is a plan view of the seat.

The improved device comprises a seat proper 1, formed on the lower side to fit the gig saddle and formed with spaced projections 2 to seat in recesses in said saddle. The rearmost projection is provided with a depending stem 3 threaded for the reception of a nut 4, whereby the seat is secured in place.

The seat 1 in the upper surface and at the forward portion thereof is formed with an undercut wedge shaped recess 5, the recess tapering toward the front. A hook 6 of ordinary construction is provided on its base with an extension 7 to fit the recess 5, so that the hook will be removably secured in place by coöperation of the projection with the recess. The forward tapering of the recess prevents separation of the hook from the recess in the forward direction, thereby insuring a more or less permanent connection with the hook and seat in the use of the parts. A crupper loop is also used in connection with the improved seat, said loop comprising a loop member 8 having a loop recess 9 and a forward projection formed with an opening 10 to fit over the rear projection 2 of the seat. The rib 11 formed integral with the seat at the juncture of the rear skirt and body portion on the under side is recessed at 12 to receive the side edges of the loop. With the seat in place on the saddle and secured by the nut 4, the crupper loop is securely held between the saddle and the seat, as will be evident from the drawings.

An improved seat such as described provides for the ready connection of the parts to the saddle in a manner to avoid accidental separation while at the same time holding all such parts in their proper position.

What is claimed is:—

A combined hook and saddle for gig saddles including a seat proper formed with a transverse flange, a threaded stem integral with the seat and depending centrally therefrom in advance of the flange, and a crupper loop having a solid portion formed with an opening to engage the stem and a rear wall to bear against the forward face of the flange, the loop having a hollow portion presenting side sections, the flange being recessed on opposite sides of its central portion to snugly receive the opposite sections of the loop, whereby the loop directly engages the flange and bears against the edge thereof for the greater portion of the transverse line of said loop.

In testimony whereof we affix our signatures in presence of two witnesses.

MILTON LEAR.
                JOHN SLOOP.

Witnesses:
  B. F. BOLTON,
  W. P. SNOW.

Copies of this patent may be obtained for five cents each, by addressing the "Commissioner of Patents, Washington, D. C."